US012755145B2

(12) United States Patent
Vongkulbhisal et al.

(10) Patent No.: US 12,755,145 B2
(45) Date of Patent: Oct. 6, 2026

(54) RECOGNIZING SOCIAL GROUPS AND IDENTIFYING ORDER IN QUEUES FROM RGB IMAGES

(71) Applicant: INTERNATIONAL BUSINESS MACHINES CORPORATION, Armonk, NY (US)

(72) Inventors: Jayakorn Vongkulbhisal, Tokyo (JP); Tatsuya Ishihara, Arakawa-ku (JP)

(73) Assignee: International Business Machines Corporation, Armonk, NY (US)

( * ) Notice: Subject to any disclaimer, the term of this patent is extended or adjusted under 35 U.S.C. 154(b) by 1144 days.

(21) Appl. No.: 17/492,208

(22) Filed: Oct. 1, 2021

(65) Prior Publication Data

US 2023/0124348 A1 Apr. 20, 2023

(51) Int. Cl.

| | |
|---|---|
| ***G06N 3/08*** | (2023.01) |
| ***G06F 18/2323*** | (2023.01) |
| ***G06V 10/40*** | (2022.01) |
| ***G06V 40/20*** | (2022.01) |

(52) U.S. Cl.

CPC ........... *G06N 3/08* (2013.01); *G06F 18/2323* (2023.01); *G06V 10/40* (2022.01); *G06V 40/20* (2022.01)

(58) Field of Classification Search

CPC ...... G06N 3/08; G06N 3/088; G06F 18/2323; G06V 10/40; G06V 40/20; G06V 10/7635; G06V 10/82; G06V 20/58; G06V 20/53

See application file for complete search history.

(56) References Cited

U.S. PATENT DOCUMENTS

| | | | | |
|---|---|---|---|---|
| 10,635,979 B2 * | 4/2020 | Hickson | ................. | G06N 3/088 |
| 11,042,756 B1 | 6/2021 | Vongkulbhisal et al. | | |
| 2015/0161444 A1 * | 6/2015 | Gallup | ................ | G06F 18/2323 707/752 |

(Continued)

FOREIGN PATENT DOCUMENTS

| | | |
|---|---|---|
| CN | 110708520 A | 1/2020 |
| CN | 201710094195 A | 3/2021 |

(Continued)

OTHER PUBLICATIONS

Michail, Othon, and Paul G. Spirakis. "Traveling salesman problems in temporal graphs." Theoretical Computer Science 634 (2016): 1-23. (Year: 2016).*

(Continued)

*Primary Examiner* — Andrew L Tank
*Assistant Examiner* — Humaira Zahin Mauni
(74) *Attorney, Agent, or Firm* — CHIP LAW GROUP

(57) ABSTRACT

A method for training a neural network to cluster multiple people in an image into groups and estimate an activity of each of the groups is provided. The method extracts a feature of each of the multiple people in the image. The method inputs the feature to the neural network to estimate an affinity matrix A and the activity of each of the groups. The method calculates a first loss between the estimated affinity matrix and a ground truth affinity matrix for the image, and a second loss between the estimated activity of each of the groups and a ground truth activity of each of the groups for the image. The first loss is calculated using Maximum Spanning Trees. The method trains the neural network based on the first and second losses.

14 Claims, 8 Drawing Sheets

(56) References Cited

U.S. PATENT DOCUMENTS

| | | | | |
|---|---|---|---|---|
| 2019/0080178 | A1* | 3/2019 | To | G06V 20/53 |
| 2020/0074165 | A1 | 3/2020 | Ghafoor et al. | |
| 2021/0073525 | A1 | 3/2021 | Weinzaepfel et al. | |
| 2024/0185434 | A1* | 6/2024 | Wyffels | G06V 20/58 |

FOREIGN PATENT DOCUMENTS

| | | | |
|---|---|---|---|
| JP | 2021043974 | A | 3/2021 |
| WO | 2020186886 | A1 | 9/2020 |

OTHER PUBLICATIONS

Vahora, S. A., and N. C. Chauhan. "Deep neural network model for group activity recognition using contextual relationship." Engineering Science and Technology, an International Journal 22.1 (2019): 47-54. (Year: 2019).*

Hedayati, Hooman, et al. "Reform: Recognizing f-formations for social robots." 2020 IEEE/RSJ International Conference on Intelligent Robots and Systems (IROS). IEEE, 2020. (Year: 2020).*

Swofford, Mason, et al. "Improving social awareness through dante: Deep affinity network for clustering conversational interactants." Proceedings of the ACM on Human-Computer Interaction 4.CSCW1 (2020): 1-23. (Year: 2020).*

Wang, Tianzhe, Zetian Jiang, and Junchi Yan. "Clustering-aware multiple graph matching via decayed pairwise matching composition." Proc. AAAI Conf. Artif. Intell. 2020. (Year: 2020).*

Barua, Hrishav Bakul, et al. "Detecting socially interacting groups using f-formation: A survey of taxonomy, methods, datasets, applications, challenges, and future research directions." arXiv preprint arXiv:2108.06181v1 (2021). (Year: 2021).*

Allen, Zachariah A. Use of traveling salesman problem solvers in the construction of genetic linkage maps. MS thesis. Colorado State University, 2015. (Year: 2015).*

Ehsanpour, Mahsa, et al. "Joint learning of social groups, individuals action and sub-group activities in videos", InComputer Vision—ECCV 2020: 16th European Conference, Glasgow, UK, Springer International Publishing, Proceedings, Part IX. Aug. 2020, pp. 1-18.

Shu, Tianmin, et al. "Joint inference of groups, events and human roles in aerial videos", InProceedings of the IEEE Conference on Computer Vision and Pattern Recognition. Jun. 2015, pp. 4576-4584.

Ge, Weina, et al. "Vision-based analysis of small groups in pedestrian crowds", IEEE transactions on pattern analysis and machine intelligence. Mar. 22, 2012, pp. 1003-1016.

Choi, Wongun, et al. "Discovering groups of people in images", InEuropean conference on computer vision. Sep. 6, 2014, pp. 1-16.

Mell et al., "The NIST Definition of Cloud Computing", National Institute of Standards and Technology, Special Publication 800-145. Sep. 2011, pp. 1-7.

* cited by examiner

RECOGNIZING SOCIAL GROUPS AND IDENTIFYING ORDER IN QUEUES FROM RGB IMAGES

BACKGROUND

The present invention generally relates to image processing, and more particularly to Maximum Spanning Trees (MST)-based losses for recognizing social groups and identifying order in queues from RGB images.

Understanding the social behavior of groups of people in a scene could provide crucial information for many applications such as, for example, identifying people in the same group and the group's activity or avoiding a robot collision into a group of conversing pedestrians.

Thus, it is desirable to be able to identify both the grouping of people, their group activity, and their order if their group is a queue. Each of the three tasks can be trained with labeled data in a supervised manner. However, it is unduly expensive to obtain the labels. Thus, a semi-supervised manner is desired to avoid having to obtain such labels.

SUMMARY

According to aspects of the present invention, a computer-implemented method for training a neural network to cluster multiple people in an image into groups and estimate an activity of each of the groups is provided. The method includes extracting a feature of each of the multiple people in the image. The method further includes inputting the feature of each of the multiple people to the neural network to estimate an affinity matrix A and the activity of each of the groups. The affinity matrix A is a n×n symmetric matrix where n is a number of persons in the image and each element $a_{ij}$ represents that an i-th person and a j-th person belong to a same group from among the groups. The method also includes calculating a first loss between the estimated affinity matrix and a ground truth affinity matrix for the image, and a second loss between the estimated activity of each of the groups and a ground truth activity of each of the groups for the image. The first loss is calculated using Maximum Spanning Trees. The method additionally includes training the neural network based on the first and second losses.

According to other aspects of the present invention, a computer program product is provided for training a neural network to cluster multiple people in an image into groups and estimate an activity of each of the groups. The computer program product includes a non-transitory computer readable storage medium having program instructions embodied therewith. The program instructions are executable by a computer to cause the computer to perform a method. The method includes extracting a feature of each of the multiple people in the image. The method further includes inputting the feature of each of the multiple people to the neural network to estimate an affinity matrix A and the activity of each of the groups. The affinity matrix A is a n×n symmetric matrix where n is a number of persons in the image and each element $a_{ij}$ represents that an i-th person and a j-th person belong to a same group from among the groups. The method also includes calculating a first loss between the estimated affinity matrix and a ground truth affinity matrix for the image, and a second loss between the estimated activity of each of the groups and a ground truth activity of each of the groups for the image. The first loss is calculated using Maximum Spanning Trees. The method additionally includes training the neural network based on the first and second losses.

According to yet other aspects of the present invention, a computer processing system for training a neural network to cluster multiple people in an image into groups and estimate an activity of each of the groups is provided. The computer processing system includes a memory device for storing program code. The computer processing system further includes a processor device operatively coupled to the memory device for running the program code to extract a feature of each of the multiple people in the image. The processor device further runs the program code to input the feature of each of the multiple people to the neural network to estimate an affinity matrix A and the activity of each of the groups. The affinity matrix A is a n×n symmetric matrix where n is a number of persons in the image and each element $a_{ij}$ represents that an i-th person and a j-th person belong to a same group from among the groups. The processor device also runs the program code to calculate a first loss between the estimated affinity matrix and a ground truth affinity matrix for the image, and a second loss between the estimated activity of each of the groups and a ground truth activity of each of the groups for the image. The first loss is calculated using Maximum Spanning Trees. The processor device additionally runs the program code to train the neural network based on the first and second losses.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to Maximum Spanning Trees (MST)-based losses for recognizing social groups and identifying order in queues from RGB images.

A maximum spanning tree is a spanning tree with weight greater than or equal to the weight of every other spanning tree.

Embodiments of the present invention propose an approach such that labels are only required for grouping and their activities.

Embodiments of the present invention can solve ordering (up to reverse ordering) without labeled data (if some order exists, e.g., for a queue).

Embodiments of the present invention can maintain high grouping and group recognition accuracy.

Figure 1:
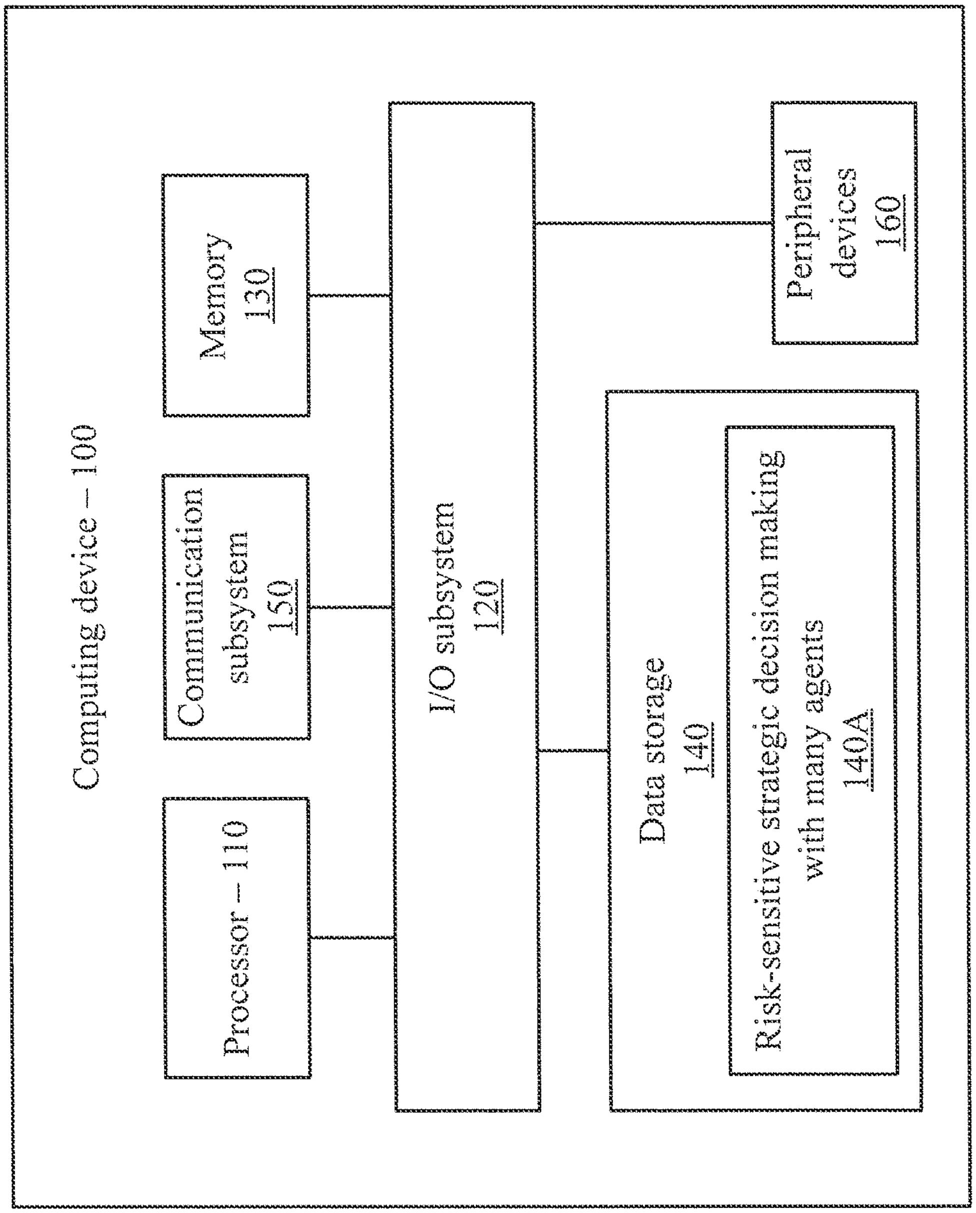
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform recognition of social groups and identification of order in queues from images in accordance with MST-based losses.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for recognition of social groups and identification of order in queues from images in accordance with MST-based losses. Data storage device 140 can include risk-sensitive strategic decision making with many agents 140A. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®), WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 7-8). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention A description will now be given of a problem solved by the present invention, as well notations used with respect thereto, in accordance with an embodiment of the present invention.

The problem can be stated as follows: Given an image including multiple people, train a model that clusters the people into groups based on their social activity and recognize the activity of each group. To be more precise, let us define the following notations.

A vector is denoted by a bold low case letter x, a matrix is denoted by a bold capital letter X, a scalar by a lower-case letter x, the i-th element of x by a subscripted letter xi, and the (i,j) element of X by the notation $x_{ij}$. Let C be the set of classes of interest (e.g., group activities), $$X = \{x^i\}_{i=1}^n \in X$$

be the set of n input features (e.g., of n pedestrians in an image), and let Y∈Y represents the clustering of X where each cluster is assigned with a class in C. Note that X may also include pairwise features of all pairs (i, j), i, j ∈{1 . . . n}. Given a dataset $$\{(X^k, Y^k)\}_{k=1}^K$$

where K is the number of training pairs, it is desired to learn a function f that maps X to Y. Note that for each k, the pair $(X^k, Y^k)$ could have an arbitrary number of input features and clusters. In addition, the present invention is particularly interested in groups whose activity is queuing. For these groups, it is desired to identify the order of the members in the queues (up to reverse ordering). Note that the ordering labels are not included in the training data.

In order to represent the GT clusters and classes in Y, let us define a symmetric affinity matrix $A \in \{0,1\}^{n \times n}$, where $a_{ij}=1$ if the entries i and j belong to the same cluster and $a_{ij}=0$ otherwise. Also, let $$v_c^i = 1$$

for c∈C it c is the class of the cluster of entry i, and $$v_c^i = 0$$

otherwise. Note that here the class of each group is defined using its members, thus if $a_{ij}=1$ then $$v_c^i = v_c^j, \forall_c \in C.$$

In addition, the present invention will also use partitions G of the index set of X to represent its clustering, e.g., if n=4 then $g=\{G^l : l \in \{1,2\}\}$ with $G^1=\{1,2,3\}$ and $G^2=\{4\}$ is used to indicate two clusters with three and one members. Finally, all matrices in this work represent undirected graphs and thus are symmetric. Hence, all related computations can be considered as being performed on their upper-triangular elements.

A description will now be given regarding a model architecture, in accordance with an embodiment of the present invention.

Since the number and the ordering of the input features in X can be arbitrary, the model architecture for this task needs to be able to receive an arbitrary number of input features while outputting an affinity matrix and class prediction vectors with the corresponding size. To handle this requirement, the present invention relies on set-based NNs, which can handle sets with an arbitrary cardinality as input and can provide outputs which are permutation-equivariant to the input's ordering. For our task, these architectures can be expressed as follows:

$$F = f_F(X),\ \tilde{A} = f_A(F),\ \{\tilde{v}_i\}_{i=1}^n = f_v(F) \tag{1}$$

where $f_F$ is a model which extract features from X; $F \in \mathbb{R}^{n \times n \times d}$ is a tensor including d-dimensional features for all pairs of (i, j); $f_A$ is a model that takes F and returns the estimated affinity matrix $\tilde{A} \in [0,1]^{n \times n}$; and $f_v$ is a model that takes F and return the estimated class probability vectors $$\{\tilde{v}^i\}_{i=1}^n \subset [0,1]^C.$$

For simplicity, in the following content, $(f_F, f_A, f_v)$ is simply referred to as f.

A description will now be given regarding identifying order in queues with MST-based losses, in accordance with an embodiment of the present invention.

To achieve this goal, the present invention introduces two loss functions for the task. The first loss, $L_{clus\text{-}mst}$, only penalizes entries in the MST of each cluster, which leads to a sparse $\tilde{A}$ that can be used to identify the order of queue without requiring the order labels for training. However, experiments show that the obtained $\tilde{A}$ is too sparse and thus achieve low clustering accuracy. Based on this finding, a modified loss, $$\mathcal{L}_{clus-mst}^{\alpha}$$

is proposed, which combines the element wise cross entropy loss with MST.

A description will now be given regarding an MST-based loss function, in accordance with an embodiment of the present invention.

Let $A_G \in \{0,1\}^{|G| \times |G|}$ denotes the submatrix of A containing the rows and columns indexed by a ground truth (GT) cluster G. Let μ be a function that takes the matrix $\tilde{A}_G$ and returns a set of edges in the MST of $\tilde{A}_G$. With μ, the MST-based loss can be expressed as follows:

$$\mathcal{L}_{clus\text{-}mst}(f(X), Y) = -\frac{1}{n_T}\sum_{G\in\mathcal{G}}\sum_{(i,j)\in\mu(\tilde{A}_G)} \ell_{BCE}(\tilde{a}_{ij}, 1) - \frac{1}{n_0}\sum_{(i,j):a_{ij}=0} \ell_{BCE}(\tilde{a}_{ij}, 0) \quad (2)$$

where $n_T=\Sigma_{G\in\mathcal{G}}(|G|-1)$ is the number of edges in all MSTs, and $n_0=\Sigma_{(i,j):aij=0}\,1$ is the number of zero elements in the A. Here, the first term in the loss trains the entries in the MST to be 1, while the second term trains the entries connecting different clusters to be 0. Note the in-cluster entries that are not part of any MST are not penalized to take any value. This means (2) penalizes fewer positive entries than prior art losses, and thus allowing Ã to be sparser. Note that since Ã of the same data ($X^k$, $Y^k$) may change in different training epochs, the present invention computes new MSTs in every batch.

A description will now be given regarding combining MST-based loss and the element wise cross entropy loss, in accordance with an embodiment of the present invention.

It has been found that training only entries in MST leads to Ã which is very sparse where $\tilde{A}_G$ almost resembles a path graph. While this is very useful to identify the order in queues, this makes it hard to set a threshold on the Laplacian eigenvalues for selecting the number of groups in spectral clustering. This is because the algebraic connectivity of a path graph can get arbitrary small if the number of nodes is large and thus any noisy entries in Ã could lead to a bad clustering result. To handle this, the following loss is proposed which combines the MST-based loss and the element wise cross entropy loss:

$$\mathcal{L}^{\alpha}_{clus\text{-}mst}(f(X), Y) = -\frac{1}{n_1}\sum_{G\in\mathcal{G}}\sum_{(i,j)\in G} \ell_{BCE}(\tilde{a}_{ij}, \hat{a}_{ij}(\tilde{A}_G, \alpha)) - \frac{1}{n_0}\sum_{(i,j):a_{ij}=0} \ell_{BCE}(\tilde{a}_{ij}, 0) \quad (3)$$

where α∈(0.5,1) is a hyperparameter, and the function $\hat{a}_{ij}(\tilde{A}_G, \alpha)=1$ if $(i, j)\in\mu(\tilde{A}_G)$ and $\hat{a}_{ij}(\tilde{A}_G, \alpha)=\alpha$ otherwise. In words, for each group G, the entries in the MST are trained to 1, while other entries are trained to α∈(0.5,1). This allows the edges in the MST to have value close to 1, which is useful for identifying the order, while other in-cluster edges are still densely connected but with the smaller value a, which is useful for the clustering.

A description will now be given regarding extracting groups, their activities, and orders of queues, in accordance with an embodiment of the present invention.

Once the model f is trained and given a new input data X, it can be used to obtain Ã and $$\{\tilde{v}^i\}_{i=1}^n.$$

Spectral clustering is performed on Ã to obtain the groups, then majority voting is used from $$\{\tilde{v}^i\}_{i=1}^n$$

to predict the activity of each group.

In addition to the group information, if a group is predicted to be a queue, the following procedures are performed to extract its order up to the reverse ordering, i.e., the order can be obtained but it is not known which direction is the front or the back. The idea for finding such order is based on finding a path graph that maximizes the sum of edge weights defined by Ã, which can be solved by employing a traveling salesman problem (TSP) solver. To do so, a weight matrix $W_{\tilde{Q}}=J_{|\tilde{Q}|}-\tilde{A}_{\tilde{Q}}$ is constructed where $\tilde{Q}$ is a set including indices of members of a queue, and $J_m$ is the matrix of ones of size m×m. Consider $W_{\tilde{Q}}$ as representing a graph where each entry $(W_{\tilde{a}})_{ij}$ indicates the distance between any two nodes i and j. Then, a TSP solver is used on $W_{\tilde{Q}}$ to obtain the ordering. Note that solving TSP returns a cycle graph, but queues are path graphs. Thus, to obtain the path solution, a dummy node is added with the distance of zero to all nodes in the graph of $W_{\tilde{Q}}$, solve the TSP, then the dummy node is removed from the cycle solution to obtain the path. The path is then returned as the ordering of the queue. To solve the TSP, the present invention initializes with a greedy solution followed by running the 2-opt algorithm.

Figure 2:
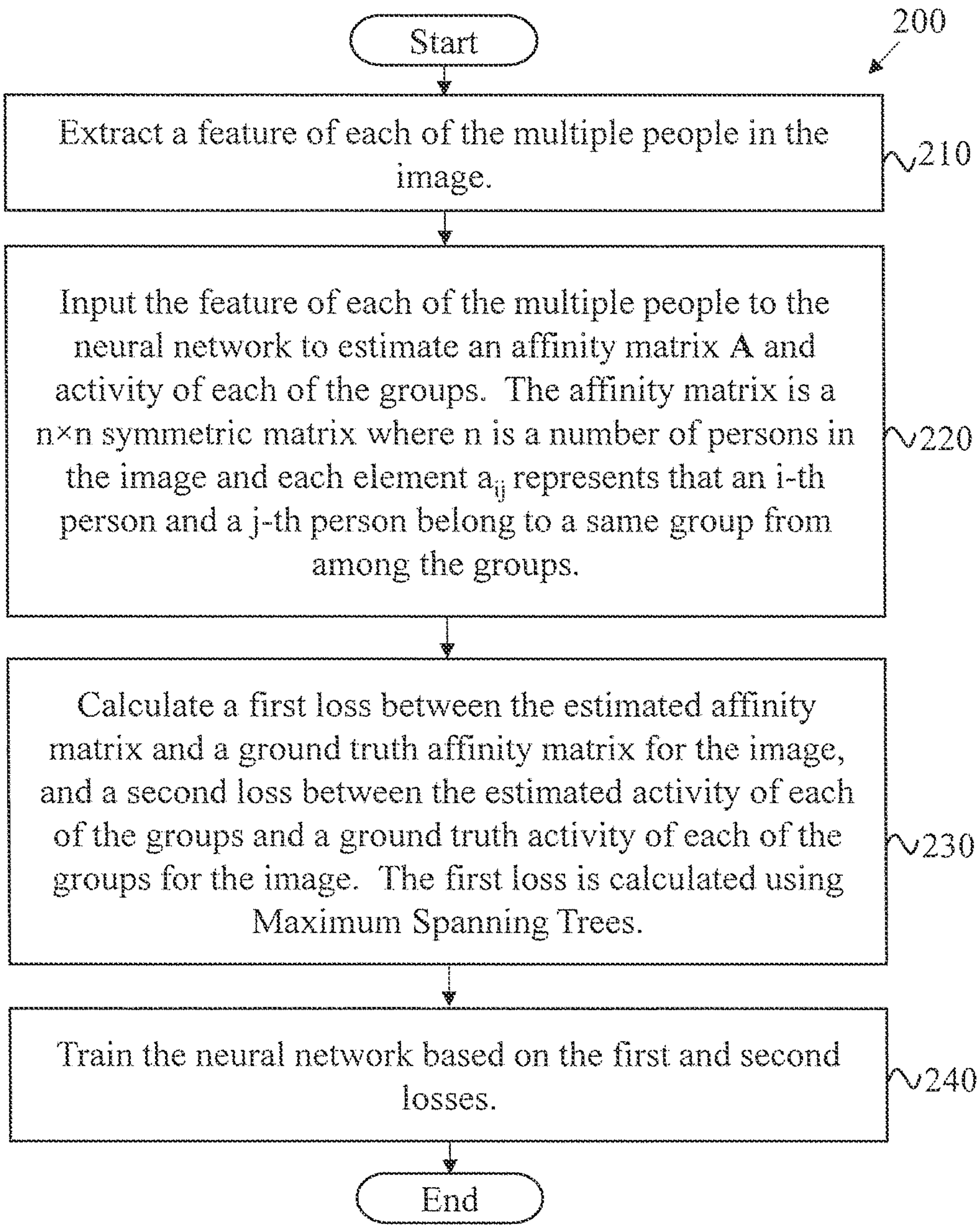
FIG. 2 is a flow diagram showing an exemplary method, in accordance with an embodiment of the present invention.

FIG. 2 is a flow diagram showing an exemplary method 200, in accordance with an embodiment of the present invention.

At block 210, extract a feature of each of the multiple people in the image.

At block 220, input the feature of each of the multiple people to the neural network to estimate an affinity matrix A and activity of each of the groups. The affinity matrix is a n×n symmetric matrix where n is a number of persons in the image and each element $a_{ij}$ represents that an i-th person and a j-th person belong to a same group from among the groups.

At block 230, calculate a first loss between the estimated affinity matrix and a ground truth affinity matrix for the image, and a second loss between the estimated activity of each of the groups and a ground truth activity of each of the groups for the image. The first loss is calculated using Maximum Spanning Trees.

At block 240, train the neural network based on the first and second losses.

Figure 3:
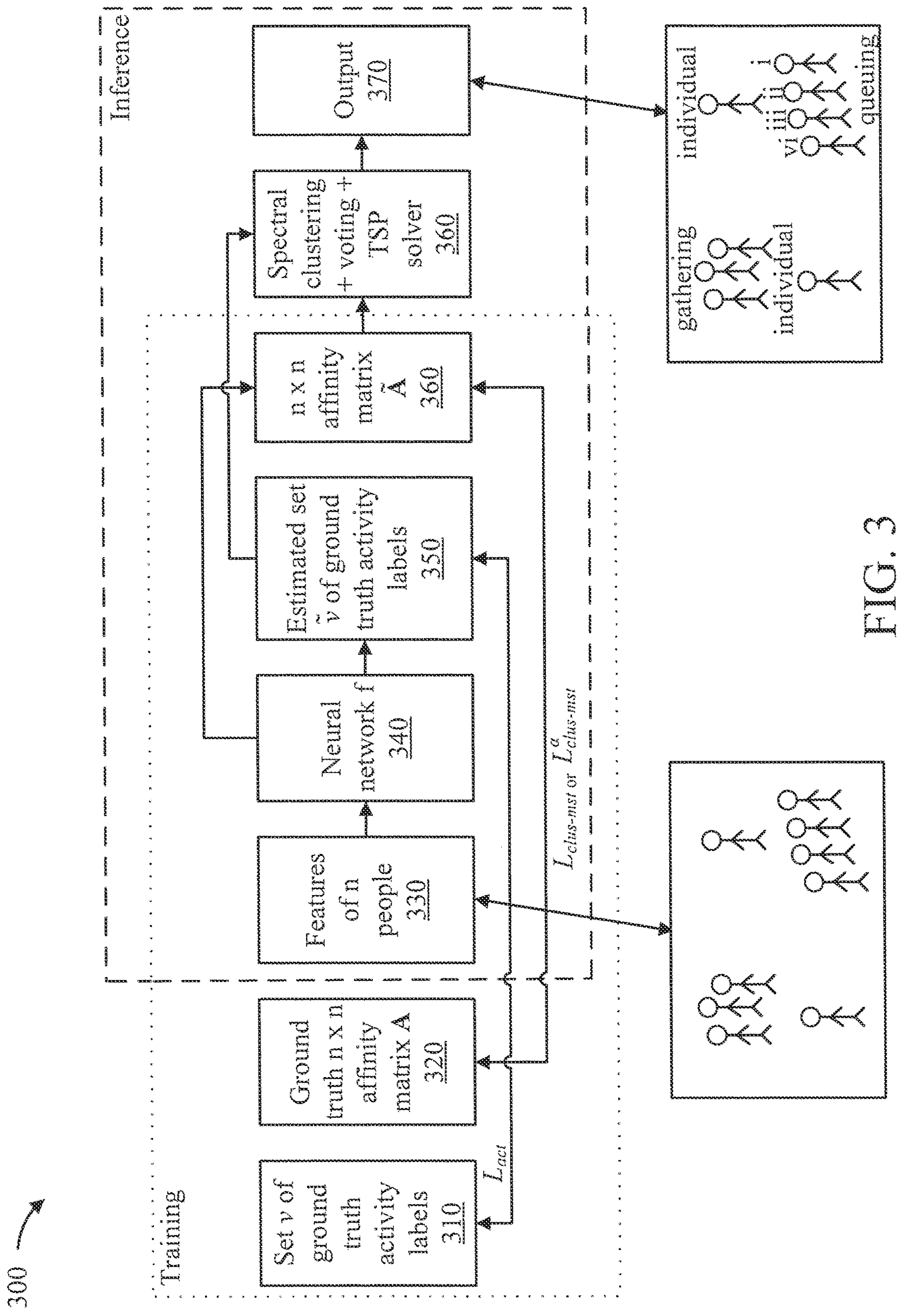
FIG. 3 is a block diagram showing an exemplary invention overview, in accordance with an embodiment of the present invention.
Figure 4:
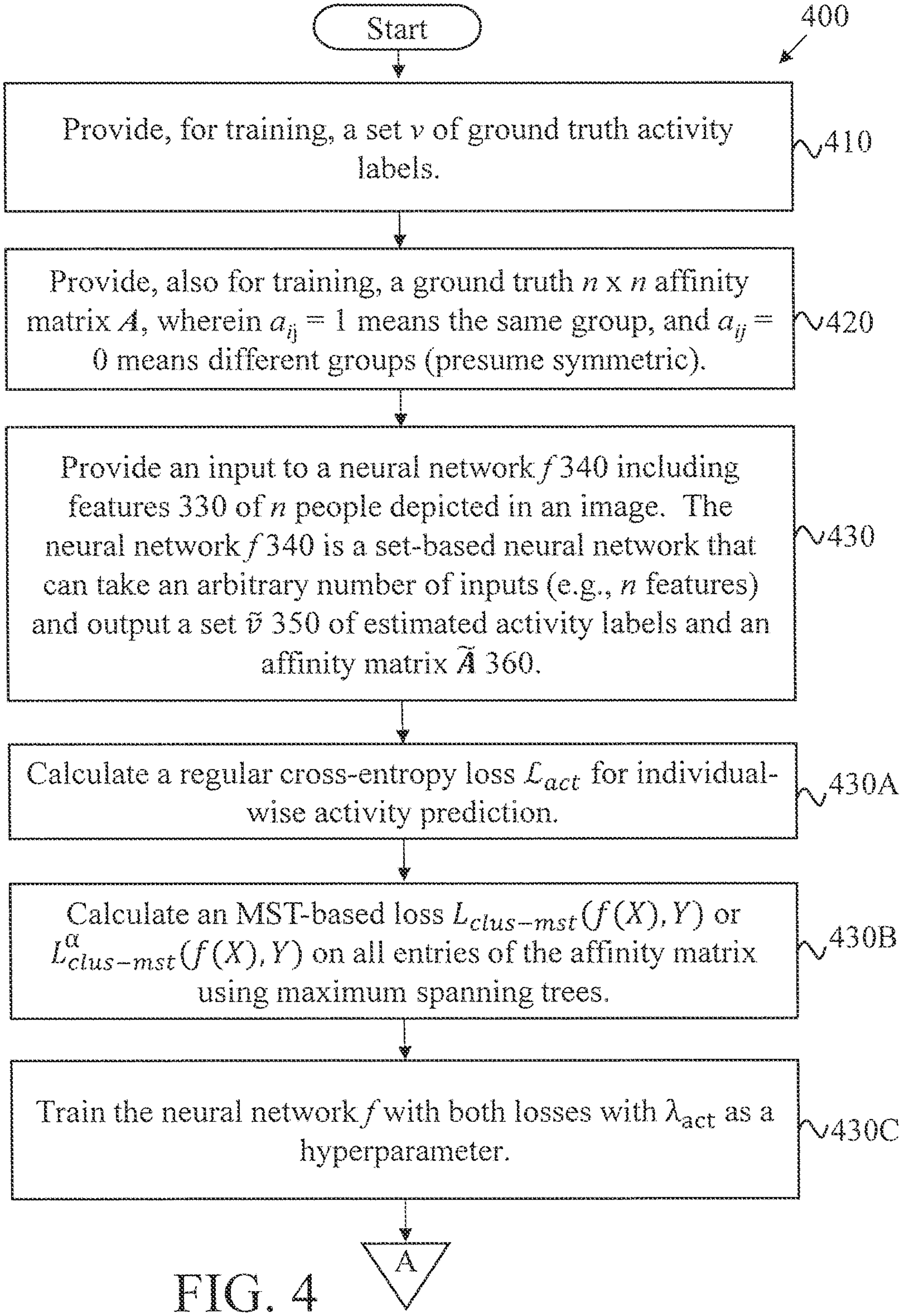
FIGS. 4-5 are flow diagrams showing an exemplary method, in accordance with an embodiment of the present invention.
Figure 5:
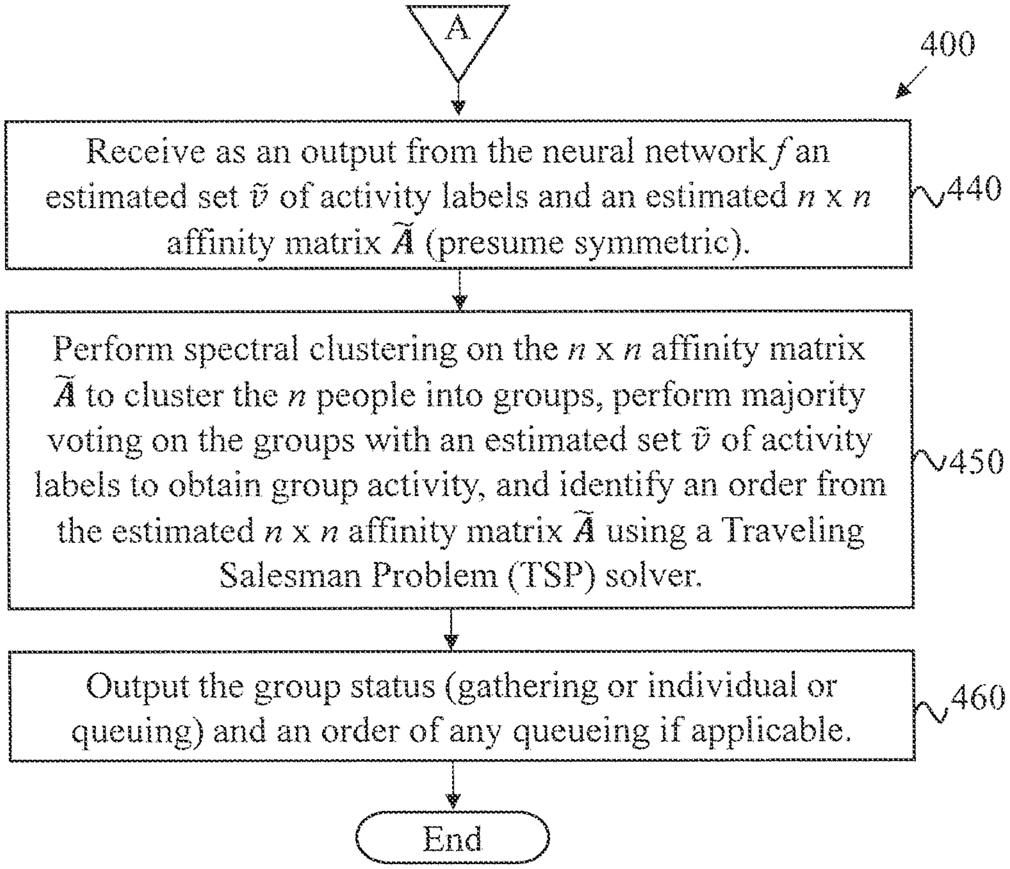

FIG. 3 is a block diagram providing an exemplary invention overview 300, in accordance with an embodiment of the present invention. FIG. 4-5 is a flow diagram providing an exemplary method 400, in accordance with an embodiment of the present invention.

At block 410, provide, for training, a set $$v=\{v^i\}_{i=1}^n$$

310 of ground truth activity label vectors.

At block 420, provide, also for training, a ground truth n×n affinity matrix A 320, wherein $a_{ij}=1$ means the same group, and $a_{ij}=0$ means different groups (presume symmetric).

At block 430, provide an input to a neural network f 340 including features 330 of n people depicted in an image. The neural network f 340 is a set-based neural network that can take an arbitrary number of inputs (e.g., n features) and output a set $$\tilde{v} = \{\tilde{v}^i\}_{i=1}^n$$

350 of estimated activity labels and an affinity matrix Ã 360. The affinity matrix is a n×n symmetric matrix where n is a number of persons in the image and each element $a_{ij}$ represents that an i-th person and a j-th person belong to a same group from among the groups.

In an embodiment, block 430 can include one or more of blocks 430A through 430C.

At block 430A, calculate a regular cross-entropy loss $\mathcal{L}_{act}$ for individual-wise activity prediction. In an embodiment, the regular cross-entropy loss $\mathcal{L}_{act}$, also referred to as a second loss, can be calculated as follows:

$$\mathcal{L}_{act}(f(X), Y) = -\frac{1}{n}\sum_{i=1}^{n}\sum_{c \in C} v_c^i \log \tilde{v}_c^i.$$

At block 430B, calculate an MST-based loss $L_{clus\text{-}mst}$(f(X), Y) or $L^{\infty}_{clus\text{-}mst}$(f(X), Y) on all entries of the affinity matrix 320 using maximum spanning trees. In an embodiment, the element-wise binary cross-entropy loss $L_{clus\text{-}mst}$(f(X), Y), also referred to as a first loss, can be calculated as follows:

$$\mathcal{L}_{clus-mst}(f(X), Y) = -\frac{1}{n_1}\sum_{G \in \mathcal{G}}\sum_{(i,j) \in \mu(\tilde{A}_G)} \ell_{BCE}(\tilde{a}_{ij}, 1) - \frac{1}{n_0}\sum_{(i,j):a_{ij}=0} \ell_{BCE}(\tilde{a}_{ij}, 0).$$

In an embodiment, the element-wise binary cross-entropy loss, $\mathcal{L}^{\infty}_{clus\text{-}mst}$(f(X), Y), also referred to as a first loss or modified loss, can be calculated as follows:

$$\mathcal{L}^{\alpha}_{clus-mst} = -\frac{1}{n_1}\sum_{G \in \mathcal{G}}\left(\sum_{(i,j) \in \mu(\tilde{A}_G)} l_{BCE}(\tilde{a}_{ij}, 1) + \sum_{(i,j) \in (G \times G) - \mu(\tilde{A}_G)} l_{BCE}(\tilde{a}_{ij}, \alpha)\right) - \frac{1}{n_0}\sum_{(i,j):a_{tj}=0} l_{BCE}(\tilde{a}_{ij}, 0)$$

where $a_{ij}$ is the (i, j) entries of A.

$\tilde{a}_{ij}$ is the (i, j) entries of Ã.

$n_1$ is the number of positive entries being trained.

$n_0$ is the number of negative entries being trained

At block 430C, train the neural network f with both losses with $\lambda_{act}$ as a hyperparameter as follows:

$$\mathcal{L}(f(X), Y) = \mathcal{L}_{clus-mst}(f(X), Y) + \lambda_{act}\mathcal{L}_{act}(f(X), Y) \text{ or}$$

$$\mathcal{L}(f(X), Y) = L^{\infty}_{clus-mst}(f(X), Y) + \lambda_{act}\mathcal{L}_{act}(f(X), Y).$$

Whichever of the preceding is used at block 430B can be considered the first loss that is used in block 430C.

At block 440, receive as an output from the neural network f an estimated set ṽ 350 of activity labels and an estimated n×n affinity matrix Ã 360 (presume symmetric).

At block 450, perform spectral clustering on the n×n affinity matrix Ã 360 to cluster the n people into groups, perform majority voting on the groups with an estimated set ṽ 350 of activity labels to obtain group activity, and identify an order from the estimated n×n affinity matrix Ã 360 using a Traveling Salesman Problem (TSP) solver. This allows for obtaining the order of groups with ordering structure (up to reverse ordering), e.g., queues, without labels for the order.

At block 460, output the group status (gathering or individual or queuing) and an order of any queueing if applicable.

A description will now be given regarding a Traveling Salesman Problem (TSP) solver, in accordance with an embodiment of the present invention.

The TSP solver solves for the following question: "Given a list of cities and the distances between each pair of cities, what is the shortest possible route that visits each city exactly once and returns to the origin city?"

TSP can be modelled as an undirected weight graph, such that cities are the graph's vertices, paths are the graph's edges, and a path's distance is the edge's weight. The TSP is a minimization problem starting and finishing at a specified vertex after having visited each other vertex exactly once. Often, the model is a complete graph (i.e., each pair of vertices is connected by an edge). If no path exists between two cities, then adding a sufficiently long edge will complete the graph without affecting the optimal tour.

In a symmetric TSP, the distance between two cities is the same in each opposite direction, forming an undirected graph. This symmetry halves the number of possible solutions. In an asymmetric TSP, paths may not exist in both directions or the distances might be different, forming a directed graph.

A description will now be given of a methodology for determining a maximum spanning tree.

Sort the edges of graph G into decreasing order by weight. Let T be the set of edges comprising the maximum weight spanning tree.

Add the first edge to T.

Add the next edge to T if and only if it does not form a cycle in T.

If T has n-1 edges (where n is the number of vertices in G), stop and output T.

In an embodiment, the 2-opt algorithm is also run on the TSP after completing the greedy approach mentioned here.

A mathematical description will now be provided for training an affinity matrix, in accordance with an embodiment of the present invention.

Let g={$G^1$, . . . , $G^K$} be the set of all ground truth groups of a training pair (X, Y).

Given a submatrix $\tilde{A}_{G^k}$ of the estimated affinity matrix Ã induced by the ground truth indices in $G^k \in G$, let $\mu(\acute{A}_{G^k})$ be a function that returns the set of edges {(i, j), . . . } ⊂ $G^k \times G^k$ belonging to the MST of $\ddot{A}_{G^k}$.

The proposed losses can be expressed as shown in Equations (2) and (3).

Figure 6:
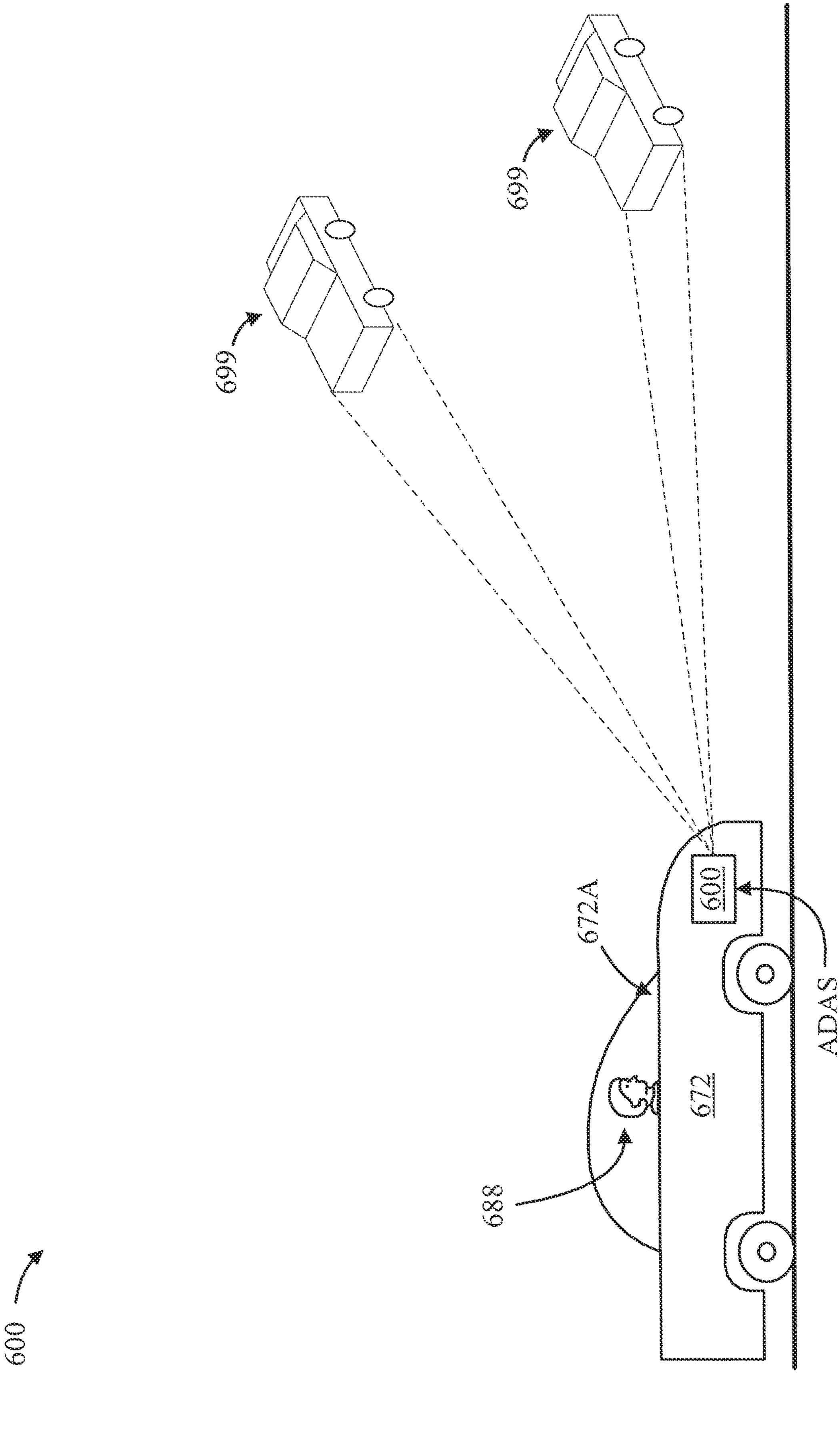
FIG. 6 is a block diagram showing an exemplary environment to which the present invention can be applied, in accordance with an embodiment of the present invention.

FIG. 6 is a block diagram showing an exemplary environment 600 to which the present invention can be applied, in accordance with an embodiment of the present invention.

In the environment 600, a user 688 is located in a scene with multiple objects 699, each having their own locations and trajectories. The user 688 is operating a vehicle 672 (e.g., a car, a truck, a motorcycle, etc.) having an ADAS 677.

The ADAS 677 uses a model trained using the first and second losses described herein to generate a prediction of an action to be taken by the vehicle 672. To that end, the ADAS 677 can control, as an action corresponding to a decision, for example, but not limited to, steering, braking, and accelerating systems.

The system of the present invention (e.g., system 600) may interface with the user through one or more systems of the vehicle 672 that the user is operating. For example, the system of the present invention can provide the user information through a system 672A (e.g., a display system, a speaker system, and/or some other system) of the vehicle 672. Moreover, the system of the present invention (e.g., system 600) may interface with the vehicle 672 itself (e.g., through one or more systems of the vehicle 672 including, but not limited to, a steering system, a braking system, an acceleration system, a steering system, a lighting (turn signals, headlamps) system, etc.) in order to control the vehicle and cause the vehicle 672 to perform one or more actions. In this way, the user or the vehicle 672 itself can navigate around these objects 699 to avoid potential collisions there between. The providing of information and/or the controlling of the vehicle can be considered actions that are determined in accordance with embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
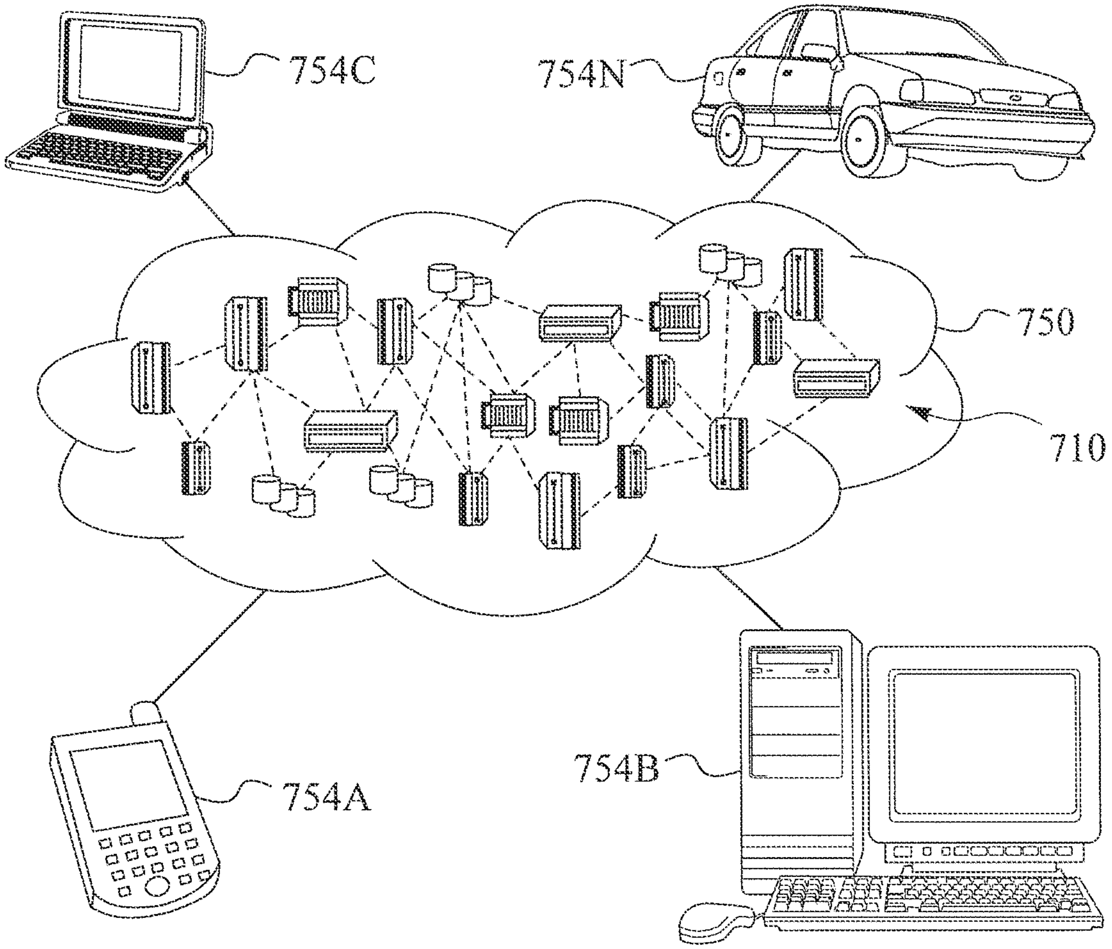
FIG. 7 is a block diagram showing an illustrative cloud computing environment having one or more cloud computing nodes with which local computing devices used by cloud consumers communicate, in accordance with an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
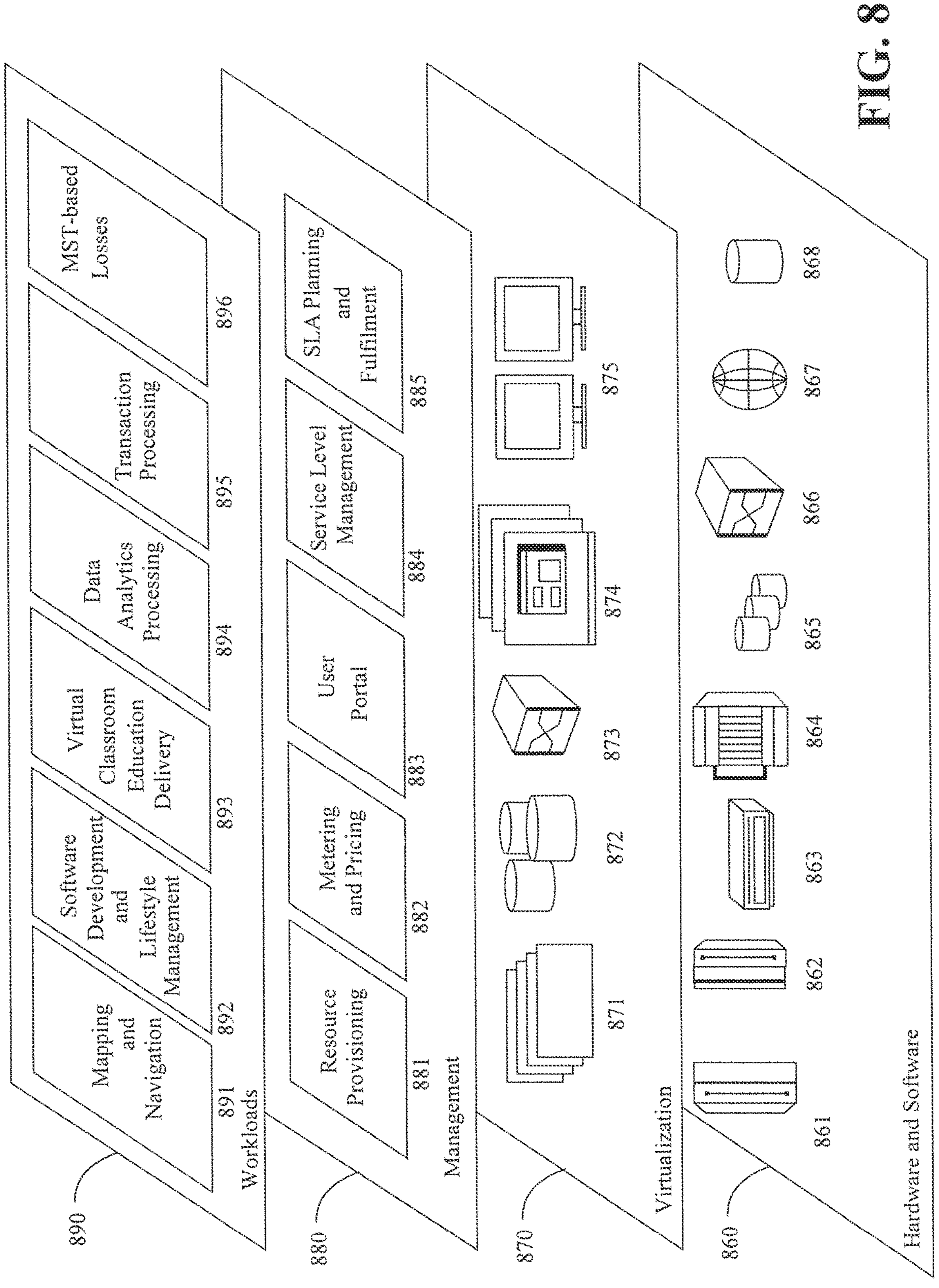
FIG. 8 is a block diagram showing a set of functional abstraction layers provided by a cloud computing environment, in accordance with an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and MST-based losses for recognizing social groups and order in the social groups 896.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for training a neural network to cluster multiple objects in an image into groups and estimate an activity of each group of the groups, the computer-implemented method comprising:

extracting a feature of each object of the multiple objects in the image;

receiving, via the neural network, an arbitrary number of features of the multiple objects with arbitrary cardinality to handle an ordering of the multiple objects in the image, the neural network being set-based;

inputting the feature of each object of the multiple objects to the neural network;

estimating, by the neural network based on the inputting, an affinity matrix A and the activity of each group of the groups, the estimated affinity matrix A being a n×n symmetric matrix where n is a number of separate objects in the image and each element $a_{ij}$ represents that i-th separate objects and j-th separate objects belong to a same group from among the groups;

calculating a first loss between the estimated affinity matrix A and a ground truth affinity matrix for the image, and a second loss between the estimated activity of each group of the groups and a ground truth activity of each group of the groups for the image, the first loss being calculated using Maximum Spanning Trees (MST) that penalizes entries in the MST within a same cluster to produce a sparser affinity matrix A, wherein the sparser affinity matrix A identifies an order of members of a queue without order labels, by finding a path graph that maximizes a sum of edge weights defined by the estimated affinity matrix A, the path graph includes a dummy node added to all nodes in the path graph, the order being direction agnostic, and the MST recomputes batches of images;

training the neural network based on the first loss and the second loss, wherein a term in the first loss trains in-cluster entries by assigning a value of greater than 0.5 and less than 1 to the in-cluster entries;

generating, based on the training of the neural network, by an Advanced Driver Assistance System (ADAS) of a vehicle, a prediction of an action taken by the vehicle to control the vehicle to avoid potential collisions according to the estimated activity; and controlling, by the ADAS, the action on the vehicle based on the prediction.

2. The computer-implemented method of claim 1, further comprising, when the estimated activity of a given group of the groups is queuing, estimating a queuing order of the number of separate objects belonging to the given group using a Traveling Salesman Problem solver, wherein the estimating of the queuing order is based on an affinity submatrix extracted from the estimated affinity matrix A.

3. The computer-implemented method of claim 2, wherein the estimating of the queuing order comprises finding the path graph that maximizes the sum of edge weights of the estimated affinity matrix A.

4. The computer-implemented method of claim 1, wherein the training of the neural network comprises training positive entries in the MST to one, and training negative entries in the MST to 0.

5. The computer-implemented method of claim 1, wherein a first term in the first loss trains entries in the MST to be one, and a second term in the first loss trains entries in the MST connecting different clusters to be 0.

6. The computer-implemented method of claim 1, further comprising predicting an activity of each group of the groups using majority voting performed on an activity set of labels formed from the estimated activity of each group of the groups.

7. A computer program product for training a neural network to cluster multiple objects in an image into groups and estimate an activity of each group of the groups, the computer program product comprising a non-transitory computer readable storage medium having program instructions embodied therewith, the program instructions executable by a computer to cause the computer to perform a method comprising:

extracting a feature of each object of the multiple objects in the image;

receiving, via the neural network, an arbitrary number of features of the multiple objects with arbitrary cardinality to handle an ordering of the multiple objects in the image, the neural network being set-based;

inputting the feature of each object of the multiple objects to the neural network;

estimating, by the neural network based on the inputting, an affinity matrix A and the activity of each group of the groups, the estimated affinity matrix A being a n×n symmetric matrix where n is a number of separate objects in the image and each element ai represents that i-th separate objects and j-th separate objects belong to a same group from among the groups;

calculating a first loss between the estimated affinity matrix A and a ground truth affinity matrix for the image, and a second loss between the estimated activity of each group of the groups and a ground truth activity of each group of the groups for the image, the first loss being calculated using Maximum Spanning Trees (MST) that penalizes entries in the MST within a same cluster to produce a sparser affinity matrix A, wherein the sparser affinity matrix A identifies an order of members of a queue without order labels, by finding a path graph that maximizes a sum of edge weights defined by the estimated affinity matrix A, the path graph includes a dummy node added to all nodes in the path graph, the order being direction agnostic, and the MST recomputes batches of images;

training the neural network based on the first loss and the second loss, wherein a term in the first loss trains in-cluster entries by assigning a value of greater than 0.5 and less than 1 to the in-cluster entries;

generating, based on the training of the neural network, by an Advanced Driver Assistance System (ADAS) of a vehicle, a prediction of an action taken by the vehicle to control the vehicle to avoid potential collisions according to the estimated activity; and controlling, by the ADAS, the action on the vehicle based on the prediction.

8. The computer program product of claim 7, wherein the method further comprises, when the estimated activity of a given group of the groups is queuing, estimating a queuing order of the number of separate objects belonging to the given group of the groups using a Traveling Salesman Problem solver, wherein the estimating of the queuing order is based on an affinity submatrix extracted from the estimated affinity matrix A.

9. The computer program product of claim 8, wherein the estimating of the queuing order comprises finding the path graph that maximizes the sum of edge weights of the estimated affinity matrix A.

10. The computer program product of claim 7, wherein the training of the neural network comprises training positive entries in the MST to one, and training negative entries in the MST to 0.

11. The computer program product of claim 7, wherein a first term in the first loss trains entries in the MST to be one, and a second term in the first loss trains entries in the MST connecting different clusters to be 0.

12. The computer program product of claim 7, wherein the method further comprises predicting an activity of each group of the groups using majority voting performed on an activity set of labels formed from the estimated activity of each group of the groups.

13. A computer processing system for training a neural network to cluster multiple objects in an image into groups and estimate an activity of each group of the groups, the computer processing system comprising:

a memory device for storing program code; and a processor device operatively coupled to the memory device for running the program code to:

extract a feature of each object of the multiple objects in the image;

receive, via the neural network, an arbitrary number of features of the multiple objects with arbitrary cardinality to handle an ordering of the multiple objects in the image, the neural network being set-based;

input the feature of each object of the multiple objects to the neural network;

estimate, by the neural network based on the inputting, an affinity matrix A and the activity of each group of the groups, the estimated affinity matrix A being a n×n symmetric matrix where n is a number of separate objects in the image and each element $a_{ij}$ represents that i-th separate objects and j-th separate objects belong to a same group from among the groups;

calculate a first loss between the estimated affinity matrix A and a ground truth affinity matrix for the image, and a second loss between the estimated activity of each group of the groups and a ground truth activity of each group of the groups for the image, the first loss being calculated using Maximum Spanning Trees (MST) that penalizes entries in the MST within a same cluster to produce a sparser affinity matrix A, wherein the sparser affinity matrix A identifies an order of members of a queue without order labels, by finding a path graph that maximizes a sum of edge weights defined by the estimated affinity matrix A, the path graph includes a dummy node added to all nodes in the path graph, the order being direction agnostic, and the MST recomputes batches of images;

train the neural network based on the first loss and the second loss, wherein a term in the first loss trains in-cluster entries unassociated with any of the MST by assigning a value of greater than 0.5 and less than 1 to the in-cluster entries;

generate, based on the training of the neural network, by an Advanced Driver Assistance System (ADAS) of a vehicle, a prediction of an action taken by the vehicle to control the vehicle to avoid potential collisions according to the estimated activity; and control, by the ADAS, the action on the vehicle based on the prediction.

14. The computer processing system of claim 13, wherein a first term in the first loss trains entries in the MST to be one, and a second term in the first loss trains entries in the MST connecting different clusters to be 0.

* * * * *